United States Patent Office 3,780,102
Patented Dec. 18, 1973

3,780,102
SUBSTITUTED CINNAMAMIDES
Michel Bayssat, Louis Fontaine, and Marcel Grand, Lyon, France, assignors to Lipha Lyonnaise Industrielle Pharmaceutique, Lyon, France
No Drawing. Original application Mar. 31, 1970, Ser. No. 24,359, now Patent No. 3,659,014. Divided and this application Sept. 10, 1971, Ser. No. 179,572
Claims priority, application France, Apr. 2, 1969, 6910054
Int. Cl. C07c *103/30*
U.S. Cl. 260—558 R                  23 Claims

ABSTRACT OF THE DISCLOSURE

The present invention concerns new cinnamamides of formula:

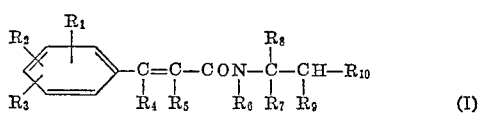

in which $R_1$ and $R_3$ are hydrogen, a lower alkyl or lower alkoxy radical; $R_2$ is hydrogen, a halogen, a lower alkyl or lower alkoxy radical; $R_4$ and $R_5$ are hydrogen or a lower alkyl radical; $R_6$ is hydrogen, a lower alkyl or lower hydroxyl alkyl radical aryl radical or $$C_2H_5NH-COO-C_2H_4-$$

$R_7$ and $R_8$ are hydrogen, a low alkyl or lower hydroxy, alkyl radical; $R_9$ is hydrogen, a lower alkyl or lower hydroxy alkyl radical; $R_{10}$=halogen, a hydroxy radical except when $R_1$ to $R_9$=H and $R_1$, $R_2$, $R_3$=CH$_3$O, $R_4$=CH$_3$ and $R_5$ to $R_9$=H, a lower alkyl radical, a lower hydroxyalkyl radical, NH$_2$—COO, a lower alkyl radical —NH—COO and aryl radical —NH—COO. The invention is relative to preparation processes and medicine containing as active principle a cinnamamide of Formula I, in which the radicals $R_1$ to $R_9$ have the same meanings as above and $R_{10}$=halogen, a hydroxy radical—except when $R_1$, $R_2$, $R_3$=CH$_3$O, $R_4$=CH$_3$ and $R_5$ to $R_9$=H—lower hydroxy alkyl, NH$_2$COO, lower alkyl —NHCOO—aryl—NHCOO.

---

This application is a divisional application Ser. No. 24,359 filed Mar. 31, 1970, now U.S. Patent 3,659,014.

The present invention relates to substituted cinnamamides.

Certain derivatives of cinnamamides are already known. The N-(2-hydroxyethyl)-cinnamamide has in particular been prepared by O. K. Behrens et al., J. Biol Chem. 175–171–92 (1948). These authors studied this molecule solely as a biosynthesis intermediary, without investigating its pharmacological properties.

The present invention is particularly concerned with novel substituted cinnamamides, as industrial products, and with new medicines containing substituted cinnamamides as active principles, which are outstanding as muscle relaxators, and in addition characterized by their low toxicity and their long duration of action.

The novel cinnamamides are represented by the formula:

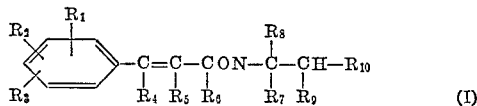

in which $R_1$ and $R_3$ are each a member of the group consisting of hydrogen, a lower alkyl and lower alkoxy radical; $R_2$ is a member of the group consisting of hydrogen, a halogen, a lower alkyl and lower alkoxy radical; $R_4$ and $R_5$ are each a member of the group consisting of hydrogen and a lower alkyl radical; $R_6$ is a member of the group consisting of hydrogen, a lower alkyl and lower hydroxy alkyl radical, aryl radical and $$C_2H_5NHCOO-C_2H_4$$

$R_7$ and $R_8$ are each a member of the group consisting of hydrogen, a lower alkyl radical or lower hydroxyalkyl radical; $R_9$ is a member of the group consisting of hydrogen, a lower alkyl and lower hydroxyalkyl radical; $R_{10}$ is a member of the group consisting of a halogen, a hydroxy radical—except when $R_1$, $R_2$, $R_3$, $R_4$, $R_5$, $R_6$, $R_7$, $R_8$ and $R_9$ are hydrogen—and when $R_1$, $R_2$ and $R_3$ are a methoxy radical, $R_4$ the methyl radical and $R_5$ to $R_9$ are hydrogen—a lower hydroxy alkyl radical, NH$_2$COO, lower alkyl NHCOO and aryl NHCOO.

The compounds of the invention, in the formulae of which $R_{10}$ is a member of the group consisting of the hydroxy, lower alkyl and lower hydroxy alkyl radical, are obtained by condensation of a reactive derivative of a cinnamic acid capable of providing the group represented by Formula II, in which (II)

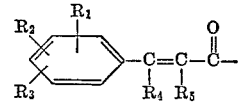

$R_1$, $R_2$, $R_3$, $R_4$ and $R_5$ have the same meanings as previously, with a hydroxy alkylamine of formula (III)

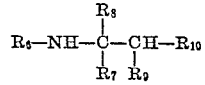

in which $R_6$, $R_7$, $R_8$ and $R_9$ have the same meanings as previously and $R_{10}$ is a member of the group consisting of hydroxy radical and lower hydroxy alkyl radical.

The reactive derivative of the cinnamic acid is preferably an acid chloride, the acid anhydride or an ester.

The transformation of the cinnamic acids capable of permitting the introduction of the group of Formula II can be effected by means of various reactants. To this end, it is possible to use phosphorus trichloride, phosphorus tribromide, phosphorus pentachloride, phosphorus pentabromide, phosphorus oxychloride, sulphuryl chloride or thionyl chloride. However, it is preferred to use thionyl chloride for the preparation of the corresponding intermediate acid chlorides.

The reaction can take place at temperatures which are within the range from about 20° C. to about 100° C. in the absence of a solvent or in a solvent which does not enter into reaction under the conditions being used. These solvents can, for example, be chloroform, methylene chloride, ether, carbon tetrachloride, benzene and analogous solvents.

The acid halide which is obtained is then treated with the appropriate hydroxy alkylamine. This reaction can be effected at temperatures which are in the range from about 5° C. to about 50° C. As the reaction can be exothermic, it is preferred to effect this in a solvent which does not enter into reaction under the conditions being used. The solvents which can be employed are, for example, chloroform, dioxane, tetrahydrofuran and analogous solvents. It is possible to use an acid acceptor, such as sodium hydroxide, sodium carbonate, potassium carbonate, sodium bicarbonate, potassium bicarbonate, pyridine, triethylamine and dimethylaniline. In certain cases, the hydroxyalkylamine can act as its own acid acceptor, by using an excess which is at least twofold of this latter.

The transformation of the cinnamic acids into corresponding acid anhydrides can easily be effected by the interaction of a cinnamic acid with its corresponding acid halide. The resulting acid anhydride is then treated with with an appropriate hydroxy alkylamine, thereby obtaining the desired amide.

The alkyl esters of cinnamic acids can easily be prepared by standard esterification processes. The amidation of intermediate esters can be effected by treatment with an appropriate hydroxy alkylamine under conditions which are well-known in the art.

The transformation of the alcohols according to Formula I into corresponding halides is easily effected by means of different reactants, by reaction of the alcohol in question with a halogenated reactant. Thionyl chloride is the preferred reactant of the invention. The reaction can be effected at temperatures which are in the range from about 10° C. to about 50° C. in a solvent which does not enter into reaction under the conditions being used. Benzene is the preferred solvent of the invention. It is also possible to use an acid acceptor, such as pyridine.

The transformation of the alcohols according to Formula I into carbamates is effected by means of an acylation agent of appropriate carbamic acid type. The expression "acyl agent of carbamic acid type," as it is used here, designates one or more compounds capable of transforming a —$CH_2OH$ group into a group represented by the Formula IV (IV)
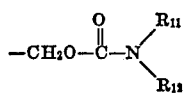

in which $R_{11}$ and $R_{12}$ are each a hydrogen atom or an alkyl or aryl radical, in one or more reaction steps. The processes for transforming hydroxyl groups into carbamate groups are well-known in practice and it is possible to employ any process of this type which gives the desired carbamates of the invention.

A very convenient method of preparation consists in causing the alcohol of General Formula I ($R_{10}$=OH or a hydroxy alkyl radical) to react with an agent of general formula:

(V)

in which R is a halogen atom, an alkoxy radical or an aryloxy radical, and X is a halogen atom, and in causing the intermediary thus formed to react with ammonia or with an amine of general formula:

in which $R_{11}$ and $R_{12}$ have the same meanings as in the Formula IV.

Phosgene is preferably used in the first step and ammonia in the second step. The ammonia can be present, for example, in the form of ammonium hydroxide. The resulting carbamate can be obtained by conventional processes, such as extraction, concentration and crystallization.

As a modification, the alcohol of General Formula I ($R_{10}$=OH or a hydroxy alkyl radical) can be caused to react with an appropriate alkyl or aryl isocyanate.

Furthermore, the use of isocyanate gives carbamates in which $R_{11}$ is a hydrogen atom and $R_{12}$ is an alkyl or aryl radical.

According to one of the objects of the invention, the new medicine described contains, as active principle, a hydroxy alkyl cinnamamide, represented by the Formula I, in which:

$R_1$ and $R_3$ are each a member of the group consisting of hydrogen, a lower alkyl and lower alkoxy radical, $R_2$ is a member of the group consisting of hydrogen, a halogen, a lower alkyl and lower alkoxy radical;

$R_4$ and $R_5$ are each a member of the group consisting of hydrogen and a lower alkyl radical;

$R_6$ is a member of the group consisting of hydrogen, a lower alkyl radical, lower hydroxy alkyl radical, aryl radical and $C_2H_5NH$—COO—$C_2H_4$;

$R_7$ and $R_8$ are each a member of the group consisting of hydrogen, a lower alkyl and lower hydroxy alkyl radical;

$R_9$ is a member of the group consisting of hydrogen, a lower alkyl and lower hydroxy alkyl radical;

$R_{10}$ is a member of the group consisting of halogen, a hydroxy radical—except when $R_1$, $R_2$, $R_3$, are a methoxy radical, $R_4$ is the methyl radical and $R_5$ to $R_9$ are hydrogen—lower hydroxy alkyl, $NH_2COO$, $C_2H_5$—NH—COO, $C_6H_5$—NH—COO The therapeutic compositions containing, as active principle, a hydroxy alkyl cinnamamide as above are effective as myorelaxants at doses which are between 10 and 1000 mg. per unit dose, it being possible to regulate the posology to obtain the best possible therapeutic response.

Examples of preparations of compounds according to the present invention are given below, as well as pharmacological and clinical tests and examples of pharmaceutical formulations, which illustrate the invention in a non-limiting manner.

EXAMPLE 1

N-(2-chlorethyl) cinnamamide: M=209.68.—

$C_{11}H_{12}ClNO$

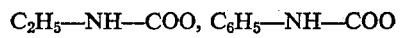

7.2 g. (0.6 mole/10) of thionyl chloride are added dropwise, at a temperature below or equal to 45° C., to a solution of 11.4 g. (0.6 mole/10) of N-(2-hydroxyethyl)-cinnamamide and 4.8 g. (0.6 mole/10) of pyridine, in 40 ml. of benzene distilled over sodium. Boiling is maintained for 4 hours. The solution is taken up in water, extracted with benzene, dried over sodium sulphate and the solvent is driven off. The yield is of the order of 74% of product, which crystallizes in a mixture (1:0.5) of hexane and dichlorethane in the form of beige-coloured flakes. M.P.=103–104.5° C. (capillary tube).

Gravimetric analysis.— Calculated (percent): C, 62.99; H, 5.77; N, 6.68; Cl, 16.91. Found (percent): C. 63.05; H, 5.79; N, 6.53; Cl, 16.97.

Infra-red spectrum (KBr):

| | Cm.$^{-1}$ |
|---|---|
| $\mu NH$ | 3.260 |
| $\mu CO$ | 1.660 |
| $\delta CH$ of CH=CH trans | 970 |
| 5 adjacent H's on the phenyl | 735–770 |

EXAMPLE 2

N - (2 - hydroxyethyl) - para - chloro cinnamamide: M=225.68.—$C_{11}H_{12}ClNO_2$

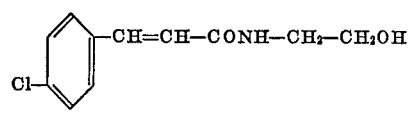

8 g. (0.4 mole/10) of para-chloro cinnamic acid chloride are added dropwise to a solution of ethanolamine in dioxane. The temperature is kept in the region of 20° C. On completing the addition, stirring takes place for one hour at normal temperature, the solution then being poured into iced water+hydrochloric acid, whereafter the formed precipitate is suction-filtered, washed with water containing bicarbonate and then again with water. The product obtained after extraction with chloroform from the mother liquors is added to that obtained after drying. A product is obtained which crystallises in the form of white needles in ethyl acetate and melts at 137–138.5° C. in a capillary tube.

Gravimetric analysis.—Calculated (percent): C, 58.53; H, 5.36; N, 6.21; Cl, 15.71. Found (percent): C, 58.72; H, 5.29; N, 6.06; Cl, 15.62.

Infra-red spectrum (KBr):

| | Cm.$^{-1}$ |
|---|---|
| μOH—NH | 3.300 |
| μCO | 1.660 |
| δCH of CH=CH trans | 975 |
| 2 adjacent H's on the phenyl | 820 |

EXAMPLE 3

N - (2 - chlorethyl) - para - chloro cinnamamide:
M=244.12.—$C_{11}H_{11}Cl_2NO$

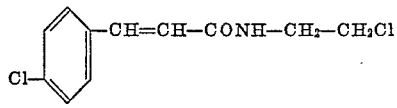

Using the conditions of Example 2 and starting with 13 g. (0.575 mole/10) of N-(2-hydroxyethyl)-para-chloro cinnamamide, a product is obtained which crystallises in the form of yellow needles in dichlorethane and melts at 144–146° C. in a capillary tube.

Gravimetric analysis.—Calculated (percent): C, 54.11; H, 4.54; N, 5.74; Cl, 29.05. Found (percent): C, 54.15; H, 4.69; N, 5.80; Cl, 28.93.

Infra-red spectrum (KBr):

| | Cm.$^{-1}$ |
|---|---|
| μNH | 3.280 |
| μCO | 1.660 |
| δCH of CH=CH trans | 970 |
| 2 adjacent H's on the phenyl | 820 |

EXAMPLE 4

N - (2 - hydroxyethyl) - para - methoxy cinnamamide:
M=221.25.—$C_{12}H_{15}NO_3$

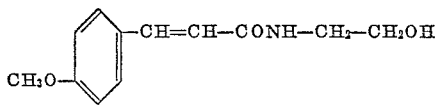

Using the condition of Example 2 and starting with 16.3 g. (mole/12) of para-methoxy cinnamic acid chloride, a product is obtained which crystallises in ethyl acetate in the form of fine white flakes and melts at 122–124° C. in a capillary tube.

Gravimetric analysis.—Calculated (percent): C, 65.14; H, 6.84; N, 6.33. Found (percent): C, 65.21; H, 6.65; N, 6.22.

Infra-red spectrum (KBr):

| | Cm.$^{-1}$ |
|---|---|
| μOH—NH | 3.420–3.300 |
| μCO | 1.650 |
| δCH of CH=trans | 975 |
| 2 adjacent H's on the phenyl | 820 |

EXAMPLE 5

N - (2 - chlorethyl) - para - methoxy cinnamamide:
M=239.70.—$C_{12}H_{14}ClNO_2$

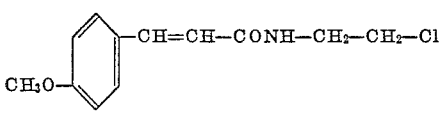

Using the working conditions of Example 1 and starting with 11.1 g. (0.5 mole/10) of N-(2-hydroxyethyl)-para-methoxy cinnamamide, a product is obtained which crystallises in dichlorethane in the form of very small beige-coloured flakes and melts at 127–128.5° C. in a capillary tube.

Gravimetric analysis.—Calculated (percent): C, 60.12; H, 5.89; N, 5.84; Cl, 14.79. Found (percent): C, 60.30; H, 5.71; N, 5.76; Cl, 14.61.

Infra-red spectrum (KBr):

| | Cm.$^{-1}$ |
|---|---|
| μNH | 3.240 |
| μCO | 1.655 |
| δCH of CH=CH trans | 980 |
| 2 adjacent H's on the phenyl | 822 |

EXAMPLE 6

N-[(2-hydroxy - 1,1 - dimethyl-ethyl]-cinnamamide:
M=219.28.—$C_{13}H_{17}NO_2$

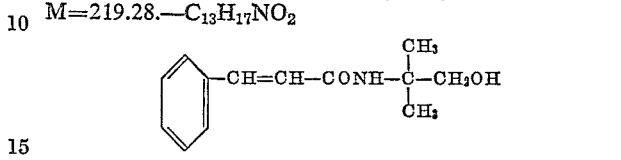

Following the conditions of Example 2 and starting with 25.2 g. (0.15 mole) of cinnamoyl chloride, 13.5 g. (0.15 mole) of 2-methyl-2-amino-1-propanol and 12.6 g. (0.15 mole) of sodium bicarbonate, a product is obtained which crystallises in ethyl acetate in the form of fine white needles and melts at 132–134° C. in a capillary tube.

Gravimetric analysis.—Calculated (percent): C, 71.20; H, 7.82; N, 6.39. Found (percent): C, 71.35; H, 8.00; N, 6.53.

Infra-red spectrum (KBr):

| | Cm.$^{-1}$ |
|---|---|
| μOH—NH | 3.290 |
| μCO | 1.660 |
| δCH of CH=CH trans | 980 |
| 5 adjacent H's on the phenyl | 770–715 |

EXAMPLE 7

N - (N - ethylethoxycarbamyl) - cinnamamide: M=262.30.—$C_{14}H_{18}N_2O_3$

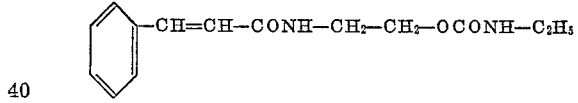

20 g. of ethylisocyanate are added to 3.8 g. (mole/50) of N-(2-hydroxyethyl)-cinnamamide. Heating takes place and, at boiling point, the alcohol enters into solution and a white precipitate appears after refluxing for about 10 minutes. The ethyl acetate in excess is distilled. A product is obtained which crystallises as a white powder in dichlorethane. Yield of the order of 90%. M.P.=148.5°–150.5° C. (capillary tube)

Gravimetric analysis.—Calculated (percent): C, 64.10; H, 6.92; N, 10.68. Found (percent): C, 63.93; H, 7.02; N, 10.80.

Infra-red spectrum (KBr):

| | Cm.$^{-1}$ |
|---|---|
| μNH | 3.320–3.240 |
| μCO | 1.695–1.660 |
| δCH of CH=CH trans | 965 |
| 5 adjacent H's on the phenyl | 780–740 |

EXAMPLE 8

N - (N - phenylethoxycarbamyl) - cinnamamide: M=310.34.—$C_{18}H_{18}N_2O_3$

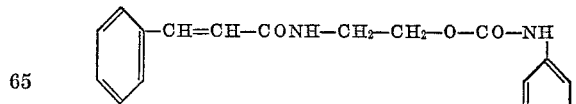

Following the operating conditions of Example 7, there are treated 1.9 g. (mole/100) of N-(2-hydroxyethyl)-cinnamamide and 1.4 g. (mole/100) of phenyl isocyanate, to which 15 ml. of carbon tetrachloride are added for homogenisation purposes, while being made tepid with agitation, and after standing, the precipitate is suction-filtered. A product is obtained which crystallises in the form of white flakes in dichlorethane. Melting point=152–154° C. (capillary tube)

Gravimetric analysis.—Calculated (percent): C, 69.66; H, 5.85; N, 9.03. Found (percent): C, 69.63; H, 5.86; N, 9.16.

Infra-red spectrum (KBr):

|  | Cm.$^{-1}$ |
|---|---|
| $\mu$NH | 3.300 |
| $\mu$CO | 1.725–1.660 |
| $\delta$CH of CH=CH trans | 975 |
| 5 adjacent H's on the phenyl | 770–725 |

EXAMPLE 9

N - (2 - hydroxyethyl)-3,4,5-trimethoxy cinnamamide: M=281.30.—$C_{14}H_{19}NO_5$

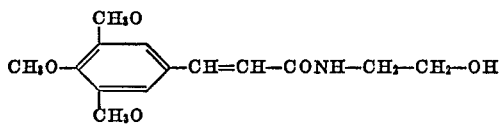

Following the conditions of Example 2 and starting with 4.8 g. (mole/50) of 3,4,5-trimethoxy cinnamic acid transformed into acid chloride, used in crude form, a product is obtained which crystallises in the form of fine white needles in dichlorethane and melts at 133–134° C. in a capillary tube.

Gravimetric analysis.—Calculated (percent): C, 59.77; H, 6.80; N, 4.98. Found (percent): C, 59.82; H, 6.64; N, 5.08.

Infra-red spectrum (Br):

|  | Cm.$^{-1}$ |
|---|---|
| $\mu$OH—NH | 3.430–3.320 |
| $\mu$CO | 1.650 |
| $\delta$CH of CH=CH trans | 965 |
| 1 adjacent H on the phenyl | 865 |

EXAMPLE 10

N-(N-ethoxycarbamyl) - cinnamamide: M=234.25.—$C_{12}H_{14}N_2O_3$

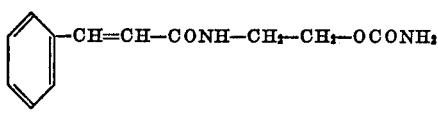

To 90 ml. (1.8 mole/10) of a solution of phosgene in toluene are added 19.1 g. (mole/10) of N-(2-hydroxyethyl)-cinnamamide in solution in 200 ml. of tetrahydrofuran and, at a temperature lower than or equal to 7° C., 23.4 g. (1.8 mole/10) of quinoline are added. A white precipitate appears. Ambient temperature is allowed to be reached, the quinoline hydrochloride is suction-filtered and dry ammonia gas is caused to bubble into the filtrate for 2 hours. The formed precipitate is suction-filtered, washed with water and added to the organic filtrate which has been concentrated.

The yield is of the order of 60 to 70% of product, which crystallises in methanol in the form of colourless flakes. M.P.=170–172° C. (capillary tube)

Gravimetric analysis.—Calculated (percent): C, 61.52; H, 6.02; N, 11.96. Found (percent): C, 61.63; H, 6.15; N, 12.10.

Infra-red spectrum (KBr):

|  | Cm.$^{-1}$ |
|---|---|
| $\mu$NH | 3.410–3.315–3.285–3.210 |
| $\mu$CO | 1.700–1.680 |
| $\delta$CH of CH=CH trans | 970 |
| 5 adjacent H's on the phenyl | 725–765 |

EXAMPLE 11

N - (3 - hydroxypropyl)-cinnamamide: M=205.25.—$C_{12}H_{15}NO_2$

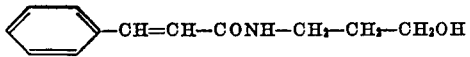

Using the working conditions of Example 2 and starting with 16.7 g. (mole/10) of cinnamoyl chloride and 30 g. (4 moles/10) of 3-amino-1-propanol, a product is obtained which crystallises in the form of white scales in dichlorethane. M.P.=82–84° C. (capillary tube).

Gravimetric analysis.—Calculated (percent): C, 70.21; H, 7.37; N, 6.83. Found (percent): C, 70.36; H, 7.48; N, 6.96.

Infra-red spectrum (KBr):

|  | Cm.$^{-1}$ |
|---|---|
| $\mu$OH—NH | 3.400–3.290 |
| $\mu$CO | 1.650 |
| $\delta$CH of CH=CH trans | 970 |
| 5 adjacent H's on the phenyl | 765–725 |

EXAMPLE 12

N - (2 - hydroxy-1-propyl-cinnamamide: M=205.25.—$C_{12}H_{15}NO_2$

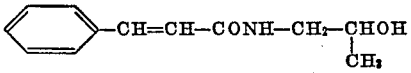

Using the working conditions of Example 2 and starting with 13.4 g. (mole/12.5) of cinnamoyl chloride and 24 g. (4 moles/12.5) of 1-amino-2-propanol, a product is obtained which crystallises in the form of a white powder in dichlorethane. M.P.=133–135° C. (capillary tube).

Gravimetric analysis.—Calculated (percent): C, 70.21; H, 7.37; N, 6.83. Found (percent): C, 70.40; H, 7.32; N, 6.87.

Infra-red spectrum (KBr):

|  | Cm.$^{-1}$ |
|---|---|
| $\mu$OH—NH | 3.370–3.300 |
| $\mu$CO | 1.660 |
| $\delta$CH of CH=CH trans | 980 |
| 5 adjacent H's on the phenyl | 765–715 |

EXAMPLE 13

N - (1,3 - dihydroxy-2-methyl-2-propyl)-cinnamamide: M=235.28.—$C_{13}H_{17}NO_3$

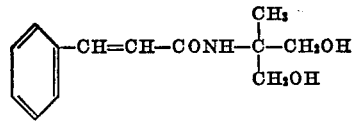

Following the working conditions of Example 2 and starting with 16.7 g. (mole/10) of cinnamoyl chloride and 23 g. (2 moles/10+10%) of 2-amino-2-methyl-propene-1,3-diol, a product is obtained which crystallises in the form of white powder in dichlorethane. M.P.=105–107° C. (capillary tube).

Gravimetric analysis.—Calculated (percent): C, 66.36; H, 7.28; N, 5.96. Found (percent): C, 66.46; H. 7.44; N, 5.97.

Infra-red spectrum (KBr):

|  | Cm.$^{-1}$ |
|---|---|
| $\mu$OH—NH | 3.420–3.310 |
| $\mu$CO | 1.660 |
| $\delta$CH of CH=CH trans | 975 |
| 5 adjacent H's on the phenyl | 772–710 |

EXAMPLE 14

N - methyl - N - 2 - hydroxyethyl cinnamamide: M=205.25.—$C_{12}H_{15}NO_2$.

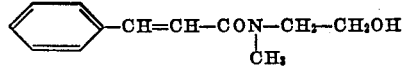

Following the conditions of Example 2 and starting with 16.7 g. (mole/10) of cinnamic acid chloride and 16.5 g. (2 moles/10+10%) of N-methyl-N-hydroxyethyl-amine, a product is obtained which crystallises in the form of a white powder in dichloroethane. M.P.=79–81° C. (capillary tube).

Gravimetric analysis.—Calculated (percent): C, 70.21; H, 7.37; N, 6.83. Found (percent): C, 70.38; H, 7.58; N, 7.00.

Infra-red spectrum (KBr):

| | Cm.⁻¹ |
|---|---|
| μOH | 3,350 |
| μCO | 1,650 |
| δCH of CH=CH trans | 980 |
| 5 adjacent H's on the phenyl | 765–705 |

EXAMPLE 15

N,N-bis(2-hydroxyethyl)cinnamamide: M=235.28.—$C_{13}H_{17}NO_3$

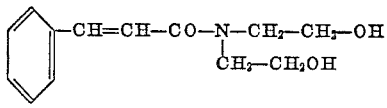

Following the conditions of Example 2 and starting with 8.4 g. (mole/20) of cinnamoyl chloride and 23 g.(2 moles/10+10%)

of diethanolamine, a product is obtained which crystallises in dichloroethane as a white powder. M.P.=80–82° C. (capillary tube).

Gravimetric analysis.—Calculated (percent): C, 66.36; H, 7.28; N, 5.96. Found (percent): C, 66.56; H, 7.45; N, 6.08.

Infra-red spectrum (KBr):

| | Cm.⁻¹ |
|---|---|
| μOH | 3,300 |
| μCO | 1,650 |
| δCH of CH=CH trans | 972 |
| 5 adjacent H's on the phenyl | 770–710 |

EXAMPLE 16

N-(1-hydroxy-2-propyl) - cinnamamide: M=205.25.—$C_{12}H_{15}NO$

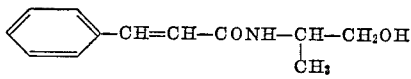

Following the conditions of Example 2 and starting with 8. 4g. (mole/20) of cinnamoyl chloride, 3.8 g. (mole/20) of alaninol and 4.2 g. (mole/20) of sodium bicarbonate, a product is obtained which crystallises as small white flakes in dichlorethane. M.P.=144–146° C. (capillary tube).

Gravimetric analysis.—Calculated (percent): C, 70.21; H, 7.37; N, 6.83. Found (percent): C, 70.29; H, 7.37; N, 6.92.

Infra-red spectrum (KBr):

| | Cm.⁻¹ |
|---|---|
| μOH—NH | 3,300 |
| μCO | 1,660 |
| δCH of CH=CH trans | 985 |
| 5 adjacent H's on the phenyl | 775–735 |

EXAMPLE 17

N-(1.3-dihydroxy-2-propyl)-cinnamamide: M=221.25.—$C_{12}H_{15}NO_3$

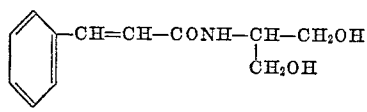

Following the conditions of Example 2 and starting with 6.5 g. (0.3 mole/10+30%) of cinnamoyl chloride, 2.7 g. (0.3 mole/10) of serinol and 3.8 g. (0.3 mole/10+50%) of sodium bicarbonate, a product is obtained which crystallises in the form of small white needles in dichloroethane. M.P.=125–126° C. (capillary tube).

Gravimetric analysis.—Calculated (percent): C, 65.13; H, 6.83; N, 6.33. Found (percent): C, 64.95; H, 6.66; N, 6.37.

EXAMPLE 18

N,N-bis-(2-hydroxyethyl)-para-methoxy cinnamamide: M=265.30.—$C_{14}H_{19}NO_4$

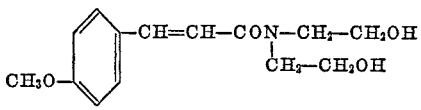

Following the conditions of Example 2 and starting with 13.5 g. (0.75 mole/10) of para-methoxy cinnamic acid chloride and 17.3 g.(0.75 mole/10+10%)

of diethanolamine, a product is obtained which crystallises as white needles in dichloroethane. M.P.=95–96° C. (capillary tube).

Gravimetric analysis.—Calculated (percent): C, 63.39; H, 7.22; N, 5.28. Found (percent): C, 63.19; H, 7.37; N, 5.15.

Infra-red spectrum (KBr):

| | Cm.⁻¹ |
|---|---|
| μOH | 3,320 |
| μCO | 1,650 |
| δCH of CH=CH trans | 975 |
| 2 adjacent H's on the phenyl | 820 |

EXAMPLE 19

N,N - bis - (2-hydroxyethyl)para-chlorocinnamamide: M=269.73.—$C_{13}H_{16}ClNO_3$

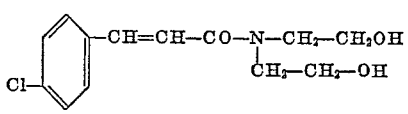

Following the conditions of Example 2 and starting with 14.6 g. (0.72 mole/10) of para-chloro cinnamic acid chloride and 33 g. (0.72 mole/5+10%) of diethanolamine, a product is obtained which crystallises as fine white needles in dichlorethane. M.P.=129–131° C. (capillary tube).

Gravimetric analysis.—Calculated (percent): C, 57.89; H, 5.98; N, 5.19; Cl, 13.15. Found (percent): C, 58.04; H, 5.91; N, 5.11; Cl, 12.97.

Infra-red spectrum (KBr):

| | Cm.⁻¹ |
|---|---|
| μOH | 3,320 |
| μCO | 1,650 |
| δCH of CH=CH trans | 975 |
| 2 adjacent H's on the phenyl | 820 |

EXAMPLE 20

N-(2-hydroxyethyl)-3,4-dimethoxy cinnamamide: M=251.28.—$C_{13}H_{17}NO_4$

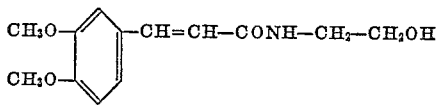

Following the conditions of Example 2 and starting with 22.6 g. (mole/10) of unpurified 3,4-dimethoxy cinnamic acid chloride, a product is obtained which crystallises in the form of small white flakes in ethyl acetate. M.P.=122–123° C. (capillary tube).

Gravimetric analysis.—Calculated (percent): C, 62.13; H, 6.82; N, 5.57. Found (percent): C, 61.87; H, 7.05; N, 5.51.

Infra-red spectrum (KBr):

| | Cm.⁻¹ |
|---|---|
| μOH—NH | 3,300 |
| μCO | 1,650 |
| δCH of CH=CH trans | 970 |
| 2 adjacent H's on the phenyl | 815 |
| 1 H on the phenyl | 865 |

EXAMPLE 21

N - bis - [N-ethylethoxycarbamyl]-cinnamamide: M= 377.43.—C$_{19}$H$_{27}$N$_3$O$_5$

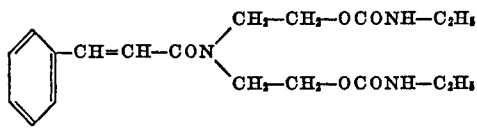

Following the conditions of Example 7 and starting with 12 g. (mole/20) of N,N-bis-(2-hydroxyethyl)-cinnamamide and 20 g. of ethyl isocyanate, a product is obtained which crystallises in dichlorethane as a cottony white product. M.P.=100–101° C. (capillary tube).

Gravimetric analysis.—Calculated (percent): C, 60.47; H, 7.21; N, 11.14. Found (percent): C, 60.64; H, 7.43; N, 11.64.

| Infra-red spectrum (KBr): | Cm.$^{-1}$ |
|---|---|
| $\mu$NH | 3.320 |
| $\mu$CO | 1.720–1.690–1.650 |
| $\delta$CH of CH=CH trans | 975 |
| 5 adjacent H's on the phenyl | 767–710 |

EXAMPLE 22

N - [N - ethoxycarbamyl]-para-chloro-cinnamamide: M=268.70.—C$_{12}$H$_{13}$ClN$_2$O$_3$

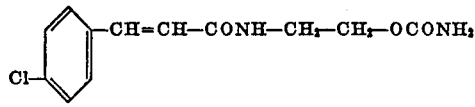

Following the conditions of Example 10 and starting with 8 g. (0.35 mole/10) of N-(2-hydroxyethyl) para-chloro cinnamamide, 200 ml. of tetrahydrofuran, 35 ml. (0.7 mole/10) of a solution of phosgene in toluene and 11.5 g. (0.35 mole/4) of quinoline, a product is obtained which crystallises as small needles having a cottony appearance in methanol. M.P.=195–196° C.

Gravimetric analysis.—Calculated (percent): C, 53.63; H, 4.88; N, 10.43; Cl, 13.19. Found (percent): C, 53.77; H, 4.85; N, 10.31; Cl, 13.04.

| Infra-red spectrum (KBr): | Cm.$^{-1}$ |
|---|---|
| $\mu$NH | 3.430–3.320–3.210 |
| $\mu$CO | 1.700–1.680 |
| $\delta$CH of CH=CH trans | 970 |
| 2 adjacent H's on the phenyl | 822 |

EXAMPLE 23

N - (2 - hydroxy-1-propyl)para-chloro-cinnamamide: M=239.70.—C$_{12}$H$_{14}$ClNO$_2$

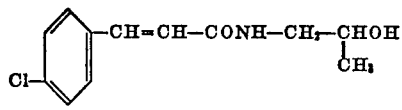

Following the working conditions of Example 2 and starting with 10.1 g. (mole/20) of para-chloro-cinnamic acid chloride and 18.7 g. (mole/4) of 1-amino-2-propanol, a product is obtained which crystallises as small white needles in ethyl acetate and melts at 150–152° C. in a capillary tube.

Gravimetric analysis.—Calculated (percent): C, 60.12; H, 5.89; U, 5.84; Cl, 14.79. Found (percent): C, 60.30; H, 5.98; N, 5.67; Cl, 14.76.

| Infra-red spectrum (KBr): | Cm.$^{-1}$ |
|---|---|
| $\mu$OH—NH | 3.300 |
| $\mu$CO | 1.660 |
| $\delta$CH of CH=CH trans | 990 |
| 2 adjacent H's on the phenyl | 825 |

EXAMPLE 24

N-[(1 - bis-hydroxymethyl - 2 - hydroxy) ethyl] cinnamamide: M=251.28.—C$_{13}$H$_{17}$NO$_4$

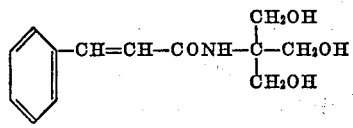

Following the conditions of Example 2 and starting with 16.7 g. (mole/10) of cinnamoyl chloride, 30 ml. of dioxane, 26.6 g. (mole/5+10%) of 2-amino-2-hydroxymethyl-propane-1,3-diol and 25 ml. of water, a product is obtained which crystallises as white needles of cottony appearance in ethyl acetate and melts at 152–154° C. in a capillary tube.

Gravimetric analysis.—Calculated (percent): C, 62.13; H, 6.82; N, 5.58. Found (percent): C, 62.25; H, 6.96; N, 5.55.

| Infra-red spectrum (KBr): | Cm.$^{-1}$ |
|---|---|
| $\mu$OH—NH | 3.300 |
| $\mu$CO | 1.660 |
| $\delta$CH of CH=CH trans | 975 |
| 5 adjacent H's on the phenyl | 770–715 |

EXAMPLE 25

N-methyl-N - (2 - hydroxyethyl)-para-chloro-cinnamamide: M=239.70.—C$_{12}$H$_{14}$ClNO$_2$

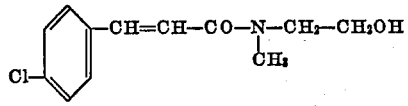

Following the conditions of Example 2 and starting with 10.1 g. (mole/20) of para-chloro-cinnamic acid chloride and 15 g. (mole/5) of N-2-methylamine ethanol, a product is obtained which crystallises as white crystals in ethyl acetate. MP.=113–115° C. in a capillary tube.

Gravimetric analysis.—Calculated (percent): C, 60.12; H, 5.89; N, 5.84; Cl, 14.79. Found (percent): C, 60.28; H, 6.00; N, 5.65; Cl, 14.77.

| Infra-red spectrum (KBr): | Cm.$^{-1}$ |
|---|---|
| $\mu$OH | 3.350 |
| $\mu$CO | 1.650 |
| $\delta$CH of CH=CH trans | 980 |
| 2 adjacent H's on the phenyl | 815 |

EXAMPLE 26

N-[(2,3 - dihydroxy) - 1 - propyl]-cinnamamide: M=221.25.—C$_{12}$H$_{15}$NO$_3$

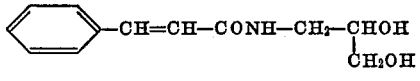

Following the conditions of Example 2 and starting with 8.4 g. (mole/20) of cinnamoyl chloride and 10 g. (mole/10+10%) of 3-amino-propane-1,2-diol, a product is obtained which crystallises as small white grains in dichlorethane and melts at 85–87° C. in a capillary tube.

Gravimetric analysis.—Calculated (percent): C, 65.13; H, 6.83; N, 6.33. Found (percent): C, 65.06; H, 6.84; N, 6.24.

| Infra-red spectrum (KBr): | Cm.$^{-1}$ |
|---|---|
| $\mu$OH—NH (large) | 3.300 |
| $\mu$CO | 1.665 |
| $\delta$CN of CH=CH trans | 970–980 |
| 5 adjacent H's on the phenyl | 755–700 |

EXAMPLE 27

N - phenyl - N - (2 - hydroxyethyl)-cinnamamide: M=267.32.—$C_{17}H_{17}NO_2$

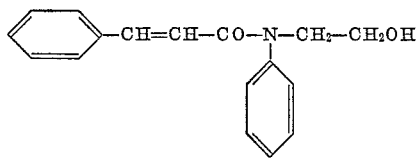

Following the conditions of Example 2 and starting with 8.4 g. (mole/20) of cinnamoyl chloride and 15 g. (mole/10+10%)

of N-(2-hydroxyethyl)-aniline, a product is obtained which crystallises in a mixture of ethyl acetate and hexane (3:1) in the form of small white flakes and which melts at 73.5° to 74.5° C. in a capillary tube.

Gravimetric analysis.—Calculated (percent): C, 76.38; H, 6.41; N, 5.24. Found (percent): C, 76.38; H, 6.48; N, 5.12.

Infra-red spectrum (KBr):

| | Cm.$^{-1}$ |
|---|---|
| $\mu$OH | 3.440 |
| $\mu$CO | 1.650 |
| $\delta$CH of CH=CH trans | 970 |
| 5 adjacent H's on the phenyl | 765–708 |

EXAMPLE 28

N - (2 - hydroxyethyl) - α - methyl cinnamamide: M=205.25.—$C_{12}H_{15}NO_2$

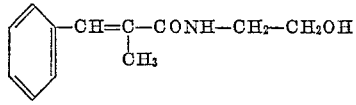

Following the conditions of Example 2 and starting with 15 g. (mole/10+25%)

of ethanolamine in 15 ml. of dioxane and 9.05 g. (mole/20) of α-methyl cinnamic acid chloride in 25 ml. of dioxane, a product is obtained which crystallises as a cottony white product in ethyl acetate and melts at 107–109° C. in a capillary tube.

Gravimetric analysis.—Calculated (percent): C, 70.21; H, 7.37; N, 6.83. Found (percent): C, 70.38; H, 7.44; N, 6.90.

Infra-red spectrum (KBr):

| | Cm.$^{-1}$ |
|---|---|
| $\mu$OH—NH | 3.300 |
| $\mu$CO | 1.650 |
| 5 adjacent H's on the phenyl | 750–705 |

EXAMPLE 29

N - (2 - hydroxyethyl) - β - methyl cinnamamide: M=205.25.—$C_{12}H_{15}NO_2$

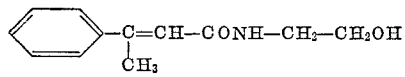

Following the conditions of Example 2 and starting with 3.6 g. (moles 2/100) of β-methyl cinnamic acid chloride (unpurified) and 10 g. of ethanolamine, a product is obtained which crystallises in dichlorethane as white crystals and melts at 75–76.5° C. in a capillary tube.

Gravimetric analysis.—Calculated (percent): C, 70.21; H, 7.37; N, 6.83. Found (percent): C, 70.11; H, 7.37; N, 6.93.

Infra-red spectrum (KBr):

| | Cm.$^{-1}$ |
|---|---|
| $\mu$OH—NH | 3.270–3.360 |
| $\mu$CO | 1.660 |
| 5 adjacent H's on the phenyl | 770–700 |

EXAMPLE 30

N - (2 - hydroxyethyl) - para - methyl cinnamamide: M=205.25.—$C_{12}H_{15}NO_2$

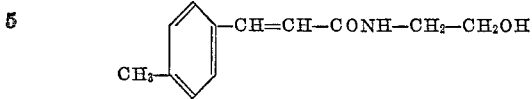

Following the conditions of Example 2 and starting with 18 g. (mole/10) of para-methyl cinnamic acid chloride and 30 g. of ethanolamine, a product is obtained which crystallises in the form of beautiful colourless needles in ethyl acetate and which melts at 107–108° C.

Gravimetric analysis.—Calculated (percent): C, 70.21; H, 7.37; N, 6.83. Found (percent): C, 70.33; H, 7.45; N, 6.92.

Infra-red spectrum (KBr):

| | Cm.$^{-1}$ |
|---|---|
| $\mu$OH—NH | 3.300 |
| $\mu$CO | 1.660 |
| $\delta$CH of CH=CH trans | 980–1.000 |
| 2 adjacent H's on the phenyl | 815 |

EXAMPLE 31

N - (2 - hydroxyethyl) - ortho-methyl cinnamamide: M=205.25.—$C_{12}H_{15}NO_2$

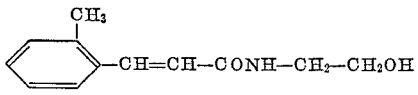

Following the conditions of Example 2 and starting with 18 g. (mole/10) of ortho-methyl cinnamic acid chloride and 30 g. of ethanolamine, a product is obtained which crystallises in ethyl acetate in the form of white crystals and melts at 120–122° C. in a capillary tube.

Gravimetric analysis.—Calculated (percent): C, 70.21; H, 7.37; N, 6.83. Found (percent): C, 70.06; H, 7.20; N, 6.86.

Infra-red spectrum (KBr):

| | Cm.$^{-1}$ |
|---|---|
| $\mu$OH—NH | 3.320 |
| $\mu$CO | 1.660 |
| $\delta$CH of CH=CH trans | 980 |
| 4 adjacent H's on the phenyl | 765 |

EXAMPLE 32

(N-(2 - hydroxyethyl) - meta-methyl cinnamamide: M=205.25.—$C_{12}H_{15}NO_2$.

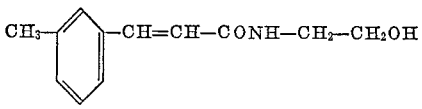

Following the conditions of Example 2 and starting with 15.3 g. (0.85 mole/10) of meta-methyl cinnamic acid chloride and 26 g. (0.425 mole/10) of ethanolamine, a product is obtained which crystallises in dichloroethane as white crystals of monohydrate. MP=80–82° C. in a capillary tube.

Proportion of water.—Calculated (percent): 8.07. Found (percent): 8.13.

Gravimetric analysis.—Calculated (percent): C, 64.54; H, 7.68; N, 6.27. Found (percent): C, 64.79; H, 7.63; N, 6.37.

Infra-red spectrum (KBr):

| | Cm.$^{-1}$ |
|---|---|
| $\mu$ OH—NH | 3.450–3.260 |
| $\mu$ CO | 1.660 |
| $\delta$ CH or CH=CH trans | 970 |
| 3 adjacent H's on the phenyl | 780 |

Pharmacological tests (1) It was possible to demonstrate the pharmacological activity of this series of compounds on the muscular contractures. These compounds modify the polysynaptic reflexes, particularly at medullary level. The myorelaxation was investigated by evaluating the protective effect of the products against the mortal convulsions initiated by injecting strychnine subcutaneously into the mouse, the alkaloid modifying the chronaxis threshold of the association medullary neurons.

The products were administered by oral route, at 1/30 of the $LD_{50}$ to the mouse, 10 minutes before the strychnine treatment. The results are given in the parent application Ser. No. 34,359 filed Mar. 31, 1970.

It should be noted that Examples 2 through 33 in the parent application correspond to Examples 1 through 32 respectively of the present application.

Clinical tests

Clinically, the compounds according to the present invention were found to be of very great interest in rheumatology, gynacology in functional rehabilitation and motive re-education, either after surgical operation, or long after paralytic attacks have abated, and also in neurological contractures developed schlerosis in discs, paraplegia. The parent application contains these clinical results.

Formulation

The medicine containing the compounds of this invention can be supplied in several suitable medicinal forms, such as tablets, injectable ampoules, suppositories and ointments for external use.

In the forms intended for internal use, the unit dose can vary from 10 to 1,000 mg. The daily dose can vary from 500 to 1,500 mg. Different formulations are given below, as nonlimiting examples.

Tablet: Mg.
  Active principle ........................... 200
  Lactose ................................... 50
  Royalgine ................................. 10
  Starch .................................... 10
  Talcum .................................... 20
  Potato starch ............................. 10
  Magnesium stearate ........................ 4
Injectable ampoule:
  Active principle ......................mg-- 30
  95° ethanol ..........................mg-- 5
  Distilled water ......................ml-- 5

In suppositories, the active doses as claimed are between 50 and 1,000 mg. As a non-limiting example:

Active principle ......................mg-- 100
  Eutactic mixture of ester of fatty acids q.s. 3 g.

For external use as an ointment, the active concentrations can be from 1% to 20%. As an example and always in non-limiting manner:

G.
  Active principle ........................... 10
  Emulsified excipient of the oil-in-water type, q.s. 100 g.

It will be obvious to those skilled in the art that various changes may be made without departing from the scope of the invention and the invention is not to be considered limited to what is described in the specification.

What is claimed is:
1. An hydroxy cinnamamide selected from the group consisting of

N-(2-hydroxyethyl)-para-chloro cinnamamide;
N-(2-hydroxyethyl)-para-methoxy cinnamamide;
N-[(2-hydroxy-1,1-dimethyl)-ethyl]-cinnamamide;
N-(3-hydroxypropyl)-cinnamamide;
N-(2-hydroxy-1-propyl)-cinnamamide;
N-methyl-N-2-hydroxyethyl cinnamamide;
N,N-bis(2-hydroxyethyl) cinnamamide;
N-(1-hydroxy-2-propyl)-cinnamamide;
N-(1,3-dihydroxy-2-propyl)-cinnamamide;
N,N-bis-(2-hydroxyethyl)-para-methoxy cinnamamide;
N,N-bis-(2-hydroxyethyl)para-chloro cinnamamide;
N-(2-hydroxyethyl)-3,4-dimethoxy cinnamamide;
N-(2-hydroxy-1-propyl)para-chloro cinnamamide;
N-[(1-bis-hydroxymethyl-2-hydroxy)ethyl] cinnamamide;
N-methyl-N-(2-hydroxyethyl)-para-chloro-cinnamamide;
N-[(2,3-dihydroxy)-1-propyl]-cinnamamide;
N-phenyl-N-(2-hydroxyethyl)-cinnamamide;
N-(1,3-dihydroxy-2-methyl-2-propyl)-cinnamamide;
N-(2-hydroxyethyl)-α-methyl cinnamamide;
N-(2-hydroxyethyl)-para-methyl cinnamamide;
N-(2-hydroxyethyl)-ortho-methyl cinnamamide; and
N-(2-hydroxyethyl)-meta-methyl cinnamamide.

2. N-(2-hydroxyethyl)-para-chloro cinnamamide in accordance with claim 1.
3. N-(2 - hydroxyethyl)-para-methoxy cinnamamide in accordance with claim 1.
4. N-[(2 - hydroxy-1,1-dimethyl)-ethyl]-cinnamamide in accordance with claim 1.
5. N-(3 - hydroxypropyl)-cinnamamide in accordance with claim 1.
6. N-(2 - hydroxy-1-propyl)-cinnamamide in accordance with claim 1.
7. N-(1,3 - dihydroxy-2-methyl-2-propyl)-cinnamamide in accordance with claim 1.
8. N-methyl - N-2-hydroxyethyl cinnamamide in accordance with claim 1.
9. N,N-bis(2 - hydroxyethyl)cinnamamide in accordance with claim 1.
10. N-(1 - hydroxy-2-propyl)-cinnamamide in accordance with claim 1.
11. N-(1,3-dihydroxy-2-propyl) - cinnamamide in accordance with claim 1.
12. N,N-bis-(2 - hydroxyethyl)-para-methoxy cinnamamide in accordance with claim 1.
13. N,N - bis-(2 - hydroxyethyl)-para-chloro cinnamamide in accordance with claim 1.
14. N-(2 - hydroxyethyl)-3,4-dimethoxy cinnamamide in accordance with claim 1.
15. N-(2 - hydroxy-1-propyl)para-chloro-cinnamamide in accordance with claim 1.
16. N-[(1 - bis-hydroxymethyl-2-hydroxy ethyl] cinnamamide in accordance with claim 1.
17. N - methyl-N-(2 - hydroxyethyl)-para-chloro-cinnamamide in accordance with claim 1.
18. N-[(2,3 - dihydroxy)-1-propyl]-cinnamamide in accordance with claim 1.
19. N-phenyl-N-(2 - hydroxyethyl) - cinnamamide in accordance with claim 1.
20. N-(2 - hydroxyethyl) - α - methyl cinnamamide in accordance with claim 1.
21. N-(2 - hydroxyethyl)-para-methyl cinnamamide in accordance with claim 1.
22. (2-hydroxyethyl)-ortho-methyl cinnamamide in accordance with claim 1.
23. N-(2 - hydroxyethyl)-meta-methyl cinnamamide in accordance with claim 1.

References Cited

Cerbai et al.: Chemical Abstracts, vol. 69, item 2921 (July 1, 1968).
Van Heyningen et al.: J. Med. Chem., vol. 9, pp. 675–81 (September 1966).
Claus et al.: Monat. Chem., vol. 97, pp. 271–80 (1966).
Reasenberg et al.: J. Am. Chem. Soc., vol. 67, pp. 933–39 (1945).

HARRY I. MOATZ, Primary Examiner

U.S. Cl. X.R.

260—471 C, 482 C, 558 D, 559 R; 424—324, 300